United States Patent
Pedersen et al.

(10) Patent No.: US 7,017,419 B2
(45) Date of Patent: Mar. 28, 2006

(54) MICRO-MECHANICAL CAPACITIVE INDUCTIVE SENSOR FOR WIRELESS DETECTION OF RELATIVE OR ABSOLUTE PRESSURE

(75) Inventors: Michael Pedersen, Bethesda, MD (US); Mehmet Ozgur, Reston, VA (US); Michael A. Huff, Oakton, VA (US)

(73) Assignee: Corporation for National Research Initiatives, Reston, VA (US)

( * ) Notice: Subject to any disclaimer, the term of this patent is extended or adjusted under 35 U.S.C. 154(b) by 0 days.

(21) Appl. No.: 10/929,446

(22) Filed: Aug. 31, 2004

(65) Prior Publication Data

US 2005/0028601 A1  Feb. 10, 2005

Related U.S. Application Data

(62) Division of application No. 10/462,811, filed on Jun. 17, 2003.

(60) Provisional application No. 60/389,292, filed on Jun. 18, 2002.

(51) Int. Cl.
*G01L 9/12* (2006.01)

(52) U.S. Cl. ........................................ 73/718

(58) Field of Classification Search ............... 73/718, 73/724, 753, 714; 361/283.1, 283.2, 283.3, 361/283.4
See application file for complete search history.

(56) References Cited

U.S. PATENT DOCUMENTS

| | | | |
|---|---|---|---|
| 3,893,228 A | 7/1975 | George et al. | |
| 3,916,365 A | 10/1975 | Glachino | |
| 4,203,327 A | 5/1980 | Singh | |
| 4,257,274 A | 3/1981 | Shimada et al. | |
| 4,625,561 A | 12/1986 | Mikkor | |
| 4,763,098 A | 8/1988 | Glenn et al. | |
| 4,881,410 A | 11/1989 | Wise et al. | |
| 5,936,164 A | 8/1999 | Sparks et al. | |
| 6,287,256 B1 | 9/2001 | Park et al. | |
| 6,532,834 B1 * | 3/2003 | Pinto et al. | 73/862.626 |
| 6,789,429 B1 * | 9/2004 | Pinto et al. | 73/718 |
| 2003/0230145 A1 | 12/2003 | Pinto et al. | |
| 2004/0035211 A1 | 2/2004 | Pinto et al. | |

FOREIGN PATENT DOCUMENTS

WO  WO 2003/106592 A3  12/2003

OTHER PUBLICATIONS

Advanced Substrate Technologies: Build-Up Technologies (BUTS) and Build-Up Multilayers (BUMS) by Happy Holden Merix Inc.
International Search Report in International Application No. PCT/US2003/019121, filed Jun. 18, 2003.

* cited by examiner

*Primary Examiner*—William Oen
(74) *Attorney, Agent, or Firm*—Nixon & Vanderhye P.C.

(57) ABSTRACT

A micro-mechanical pressure transducer is disclosed in which a capacitive transducer structure is integrated with an inductor coil to form a LC tank circuit, resonance frequency of which may be detected remotely by imposing an electromagnetic field on the transducer. The capacitive transducer structure comprises a conductive movable diaphragm, a fixed counter electrode, and a predetermined air gap between said diaphragm and electrode. The diaphragm deflects in response to an applied pressure differential, leading to a change of capacitance in the structure and hence a shift of resonance frequency of the LC tank circuit. The resonance frequency of the LC circuit can be remotely detected by measuring and determining the corresponding peak in electromagnetic impedance of the transducer.

21 Claims, 7 Drawing Sheets

MICRO-MECHANICAL CAPACITIVE INDUCTIVE SENSOR FOR WIRELESS DETECTION OF RELATIVE OR ABSOLUTE PRESSURE

This application is a divisional of application Ser. No. 10/462,811, filed Jun. 17, 2003, and claims the benefit of Provisional Application Ser. No. 60/389,292, filed Jun. 18, 2002, the entire contents of which are hereby incorporated by reference in this application.

FIELD OF THE INVENTION

The present invention pertains to the field of pressure sensors, and more specifically to capacitive pressure sensors, remote sensing, and to the fields of micro fabrication and micro electro mechanical systems (MEMS).

BACKGROUND OF THE INVENTION

Pressure sensors made by micro machining methods are well known and considered one of the most mature applications for MEMS technology. Since the early 1970's, pressure sensitive diaphragms have been formed from silicon substrates, the deflection of which have been detected by optical, piezoresistive, piezoelectric or capacitive means. So far, the most significant detection method used for commercial applications has been piezoresistive detection, which is convenient to implement since single crystal silicon is an inherently piezoresistive material. Examples of piezoresistive pressure sensors are disclosed in U.S. Pat. Nos. 3,893,228, 3,916,365, 4,203,327, and 4,763,098.

Another significant method is capacitive detection, which provides for lower transducer noise and better thermal stability, but requires more complex mechanical structures, since the capacitance between the movable diaphragm and a fixed counter electrode must be established. Examples of capacitive pressure transducers are disclosed in U.S. Pat. Nos. 4,257,274, 4,881,410, 4,625,561 and 5,936,164. An important realization for remote sensing purposes is that capacitive transducer devices do not consume power, as is the case for piezoresistive devices in which a biasing resistor must be used to detect a change in voltage or current. In remote sensing it is desirable to minimize transducer power consumption to reduce the size of the required power source (i.e., battery). If a capacitive transducer is combined with a coil, an LC circuit with theoretical resonance frequency of $f_{res}=(2\pi\sqrt{LC})^{-1}$ is formed. If the coil is further designed, such that an external electromagnetic field may easily becoupled into the coil (i.e., a planar coil), the resonance frequency of the LC circuit may be detected remotely by analyzing the coupling impedance of the LC circuit to a transmitter coil. A pressure induced change of capacitance C in the transducer then leads to a shift in the LC circuit's resonance frequency, which may be detected remotely. Wireless pressure transducers based on this approach are disclosed in L. Rosengren et al., "A system for passive implantable pressure sensors", Sensors & Actuators, vol. A43 (1994), pp. 55–58 and in U.S. Pat. No. 6,287,256.

Figure 1:
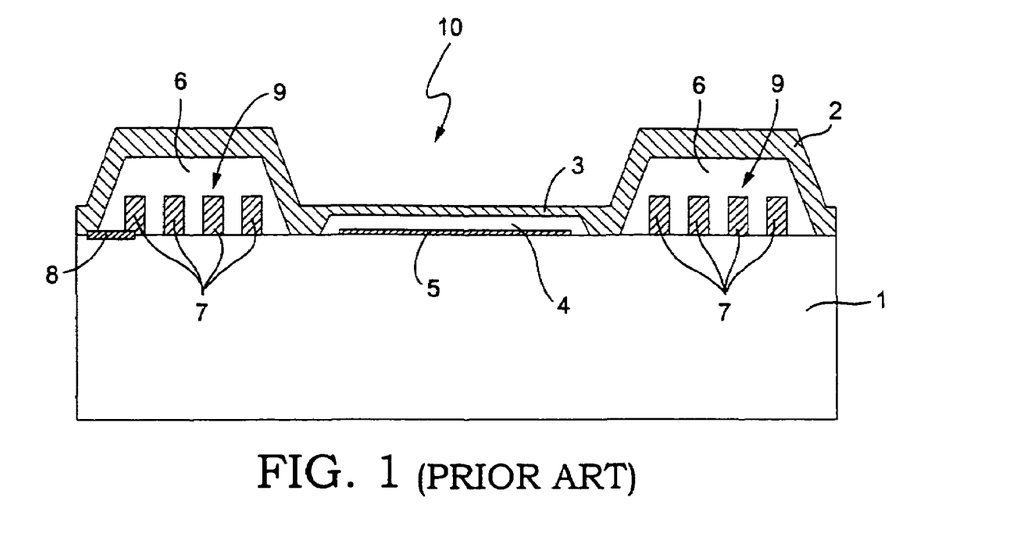
FIG. 1 is a cross-sectional view of a prior art capacitor/inductor pressure sensing structure.

A prior art wireless pressure sensor 10 is shown in FIG. 1. A silicon substrate 2 is etched from both sides to form a recessed diaphragm 3 and cavities 6. On a separate glass substrate 1, a planar metal inductor coil 9 is formed with windings 7. Also formed on glass substrate 1 are a fixed counter electrode 5 and an electrical connection 8. The silicon substrate 2 and glass substrate 1 are bonded together using anodic bonding methods to form the complete pressure sensor 10. When bonded together, the recess at the diaphragm 3 establishes an operational air gap 4 between the diaphragm 3 and the fixed counter electrode 5. An important parameter for the inductor coil 9 used in conjunction with the capacitor is the quality factor (Q), which is a measure of the sharpness of the resonance, and hence the relation between inductance and resistive loss of the electrical connection 8 and coil 9. The quality factor directly influences the precision with which the resonance frequency can be determined by inductive coupling, and therefore, the resolution of the pressure sensor 10. Unfortunately, in prior art devices based on planar coils, as shown in FIG. 1, there are several limitations that affect the quality factor of the coil. First, the number of windings 7 that can be realized is restricted, since they are placed outside the diaphragm 3 and therefore, add to the overall dimensions of sensor 10. Second, the materials used to form the windings 7 of the coil 9 are typically deposited by electroplating to achieve sufficient metal thickness. Electroplated metals are known to have inferior resistivity compared to metals deposited by other means, which therefore results in significant resistive losses in the coil 9.

SUMMARY OF THE INVENTION

It is, therefore, an object of the present invention to provide a complete capacitor/inductor pressure sensing structure which has an improved overall resonance quality factor compared to prior art devices.

It is another object of the present invention to realize such improvement by increasing the quality factor of the inductor by increasing the inductance and decreasing the resistive loss in the inductor.

It is a further object of the present invention to achieve the increase in inductance while at same time reducing the overall dimensions of the pressure sensing structure.

It is yet another object of the present invention to realize an inductor structure, which has optimal coupling properties to an externally induced electromagnetic field.

It is still a further object of the present invention to provide the pressure sensing structure in a simple hermetically sealed assembly, in which only the diaphragm is exposed to the environment.

It is a further object of this invention to realize the pressure sensing structure and assembly in a manner that minimizes fabrication cost and manufacturing complexity.

The present invention is a micro-mechanical pressure transducer in which a capacitive transducer structure is monolithically integrated with an inductor coil to form a LC tank circuit, the resonant frequency of which may be detected remotely by imposing an electromagnetic field on the transducer. The capacitive transducer structure is comprised of a conductive movable diaphragm, a fixed counter electrode, and a predetermined air gap between said diaphragm and electrode. The diaphragm deflects in response to an applied pressure differential, leading to a change of capacitance in the structure and hence a shift of resonance frequency of the LC tank circuit. The resonance frequency of the LC circuit can be remotely detected by measuring and determining the corresponding peak in electromagnetic impedance of the transducer.

The present invention is based on the realizations that the physical limitation on the dimensions, and, hence inductance, of a coil is caused by having only one usable plane for the windings of the coil, that if several planes are utilized, the inductance can be scaled correspondingly, and that if the area occupied by a device's movable diaphragm can also be utilized for a coil, additional inductance could be realized.

For wireless communication applications, a thick film technology known as low-temperature co-fired ceramics (LTCC) has been developed for operating frequencies in excess of 10 GHz. This technology utilizes multi layer stacks of screen printed, or etched, conductors and dielectric foils, to realize complex interconnections of up to 20 layers or more. Passive devices, such as inductors, resistors and capacitors, with excellent RF properties can be implemented using LTCC technology. To include an LTCC substrate in a narrow air gap capacitive structure, as needed for a pressure sensor, the LTTC material must be polished to provide a smooth surface on which thin films of sub-micron thickness can be deposited, and to which a second substrate containing the movable diaphragm can be bonded and hermetically sealed.

The present invention is comprised of an LTCC substrate, in which a high quality inductor and fixed counter electrode have been formed, and a second substrate in which a pressure sensitive diaphragm has been formed. When the substrates are bonded together, the diaphragm and fixed counter electrode form a pressure sensitive capacitor connected internally to a coil. The inductor coil is implemented in several layers in the LTTC substrate directly under the fixed counter electrode and movable diaphragm to reduce the overall size of the device.

DETAILED DESCRIPTION OF THE INVENTION

Figure 2:
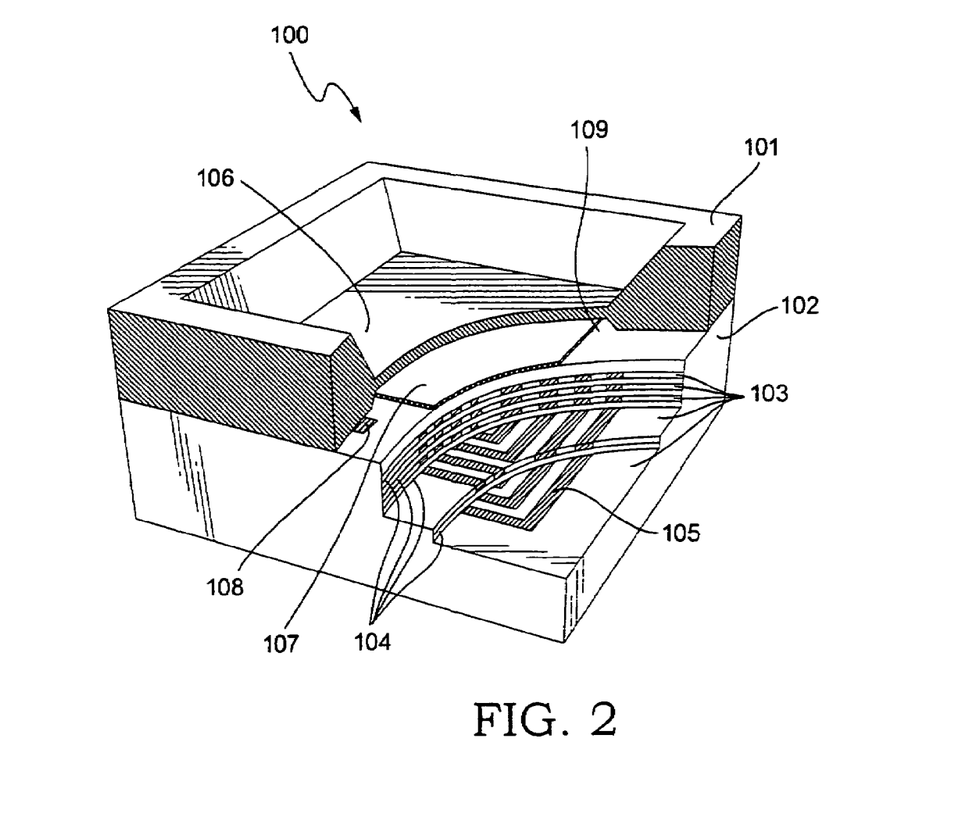
FIG. 2 is a perspective view of a capacitor/inductor pressure sensing structure according to the present invention.
Figure 3:
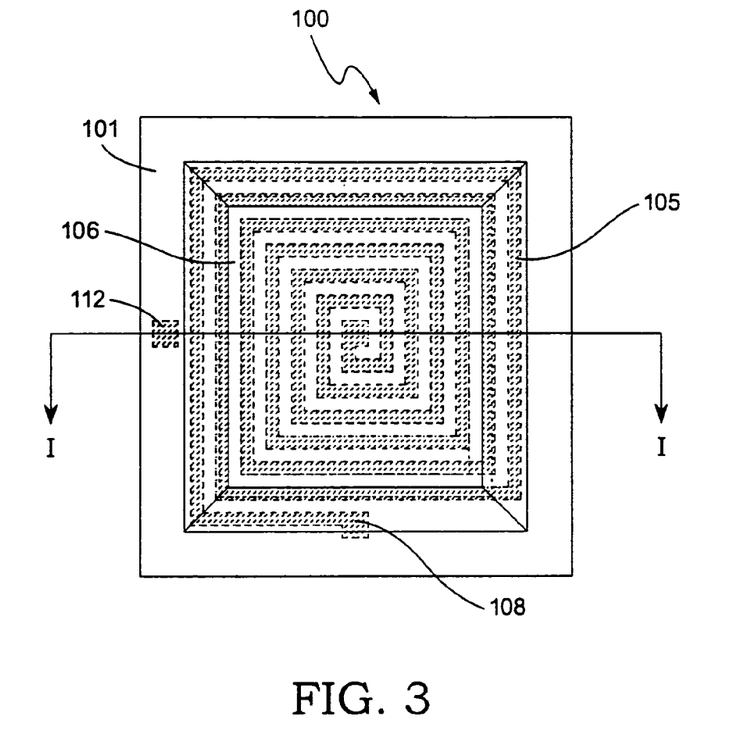
FIG. 3 is top plan view of the a capacitor/inductor pressure sensing structure according to the present invention.
Figure 4:
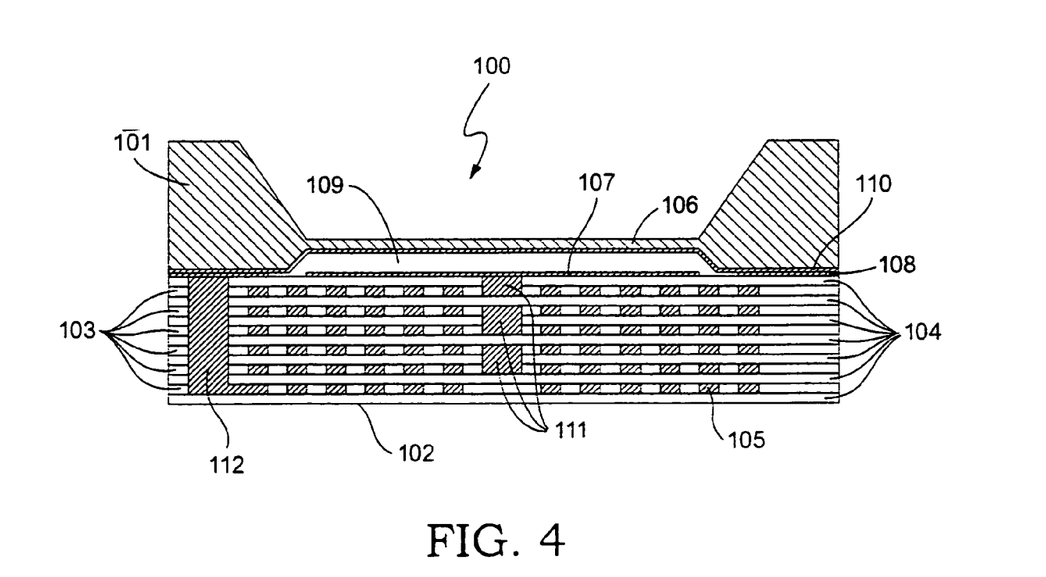
FIG. 4 is a cross-sectional view of a capacitor/inductor pressure sensing structure according to the present invention taken along the section line A—A in FIG. 3.

One embodiment of a pressure sensing structure according to the present invention is shown in perspective view in FIG. 2, top plan view in FIG. 3, and cross-sectional view in FIG. 4. The pressure sensing structure 100 consists of a substrate 101, containing a thin diaphragm 106, and a second hybrid substrate 102, in which an electrical inductor 105 has been formed. The two substrates 101 and 102 are bonded together and hermetically sealed to form a cavity 109. Any deflection of the diaphragm 106 in response to a pressure differential between the sealed cavity and the exterior atmosphere results in a change of capacitance between a fixed counter electrode 107 and a conductive layer 110 on diaphragm 106. Inductor 105 is connected to the fixed electrode 107 by via 111, shown in FIG. 4, and to a conductive layer 110 on diaphragm 106 through via 112 and conductive layer 108. The inductor 105 is formed in multi layered hybrid substrate 102. A preferred technology for the implementation of inductor 105 is low-temperature co-fired ceramics (LTCC), in which twenty or more conductive layers may be formed. Since the conductors in LTCC technology are relatively thick, it is possible to realize inductors with large inductance values and quality factors (Q). Other technologies that can be used for the implementation of second hybrid substrate 102 are a high-temperature co-fired ceramic (HTCC) and sequentially-build-up (SBU) multi-layer printed circuit boards (PCB). Where an SBU-PCB architecture is used to form second hybrid substrate 102, polymers, such as epoxy, polyimide, and silicone, would be used instead of ceramic dielectric layers. As such, hermetic packaging would not be possible with the SBU-PCB architecture.

Figure 15:
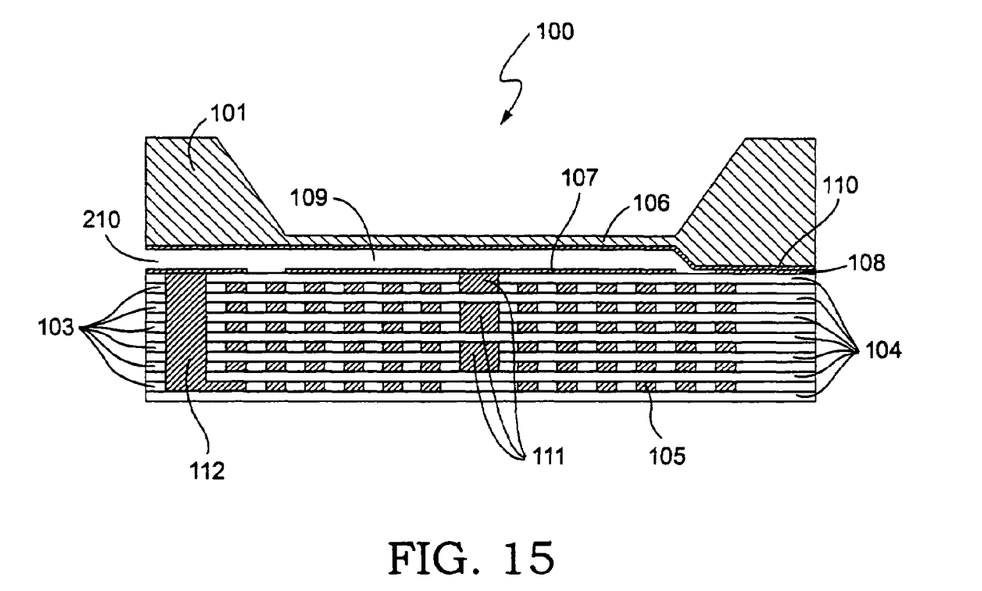
FIG. 15 is a cross-sectional view of a capacitor/inductor pressure sensing structure according to the present invention with a port to form a differential pressure sensor.
Figure 16:
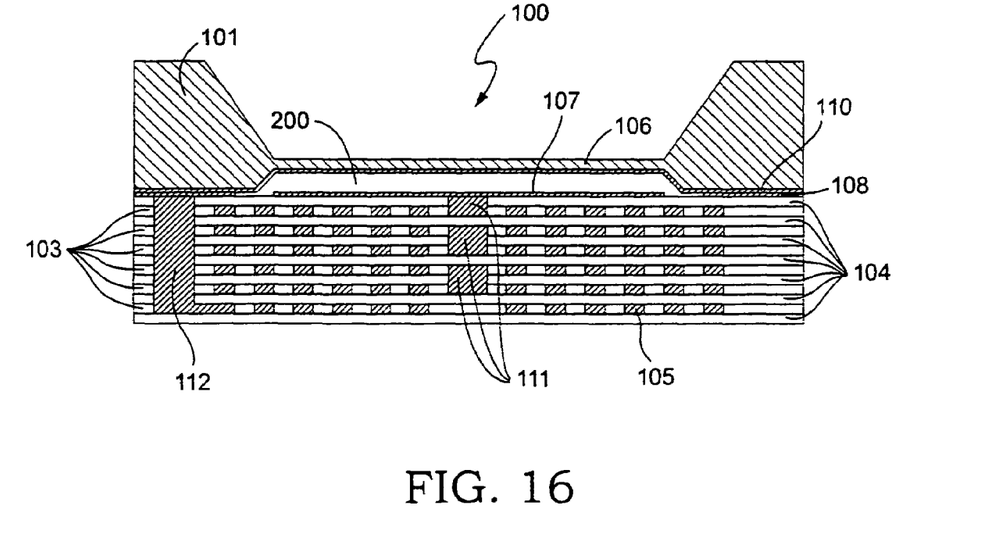
FIG. 16 is a cross-sectional view of a capacitor/inductor pressure sensing structure according to the present invention in which the air cavity has been sealed in a controlled environment to form an absolute reference pressure sensor.

Hybrid substrate 102 consists of multiple layers with spiraling conductors 103 and insulating layers 104. A number of vias 111 and 112 are placed in each insulating layer 104 to connect the spiral conductors 103. Vias 111 and 112 are placed, such that when an electromagnetic field is imposed perpendicular to the plane of the spiral conductors 103, a unidirectional current is induced in the conductors. This is important to maximize the overall sensitivity of the pressure sensing device 100. Device 100 shown in FIG. 2 is an absolute pressure transducer. Device 100 can also be implemented with a port 210, as shown in FIG. 15, to form a differential pressure transducer, or with a reference cavity 200, as shown in FIG. 16, to form an absolute reference pressure transducer.

Figure 5:
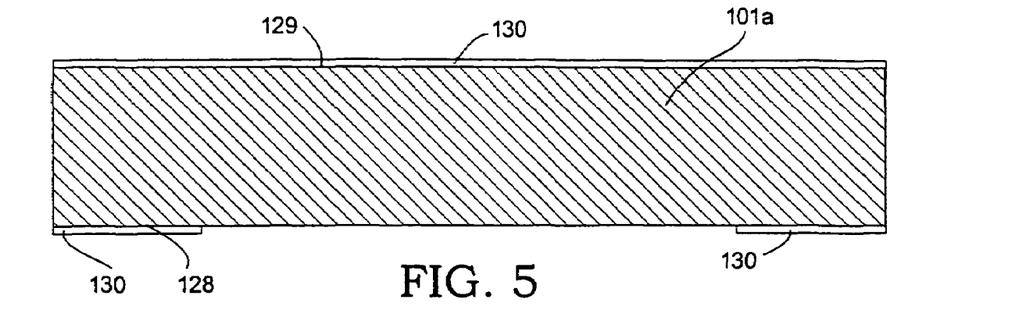
FIG. 5 through FIG. 14 are cross-sectional views of a capacitor/inductor pressure sensing structure according the present invention at different stages of fabrication.
Figure 6:
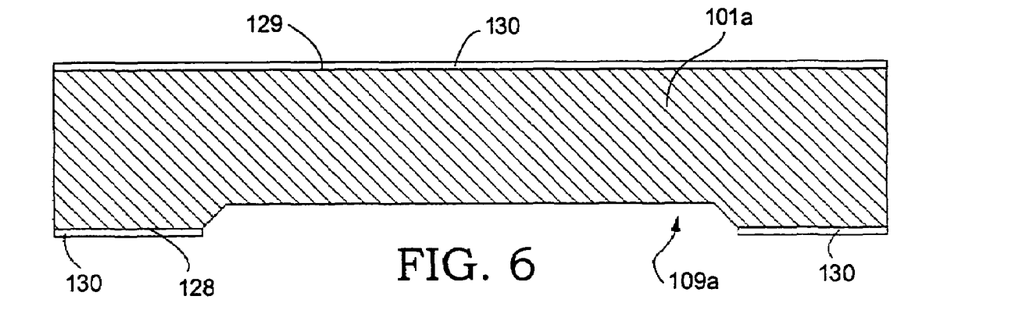

A preferred micro-fabrication process for forming pressure sensing structure 100 according to the present invention is shown in FIGS. 5–14. Fabrication of the first substrate 101 begins from a virgin substrate 101a on which a masking layer 130 is deposited, as shown in FIG. 5. Preferred materials for masking layer 130 include silicon dioxide, silicon nitride, and photoresist. A preferred material for substrate 101a is single crystal silicon. Another material for substrate 101a is silicon on insulator (SOI). Masking layer 130 is patterned on the front 128 of substrate 101a. As shown in FIG. 6, a cavity 109a is etched in substrate 101a. A preferred method for etching cavity 109a is immersion in potassium hydroxide (KOH), or other commonly used anisotropic silicon etchants, which include, but are not limited to, tetramethyl ammonium hydroxide (TMAH), cesium hydroxide (CsOH), and ethylenediamene pyrocatecol (EDP).

Figure 7:
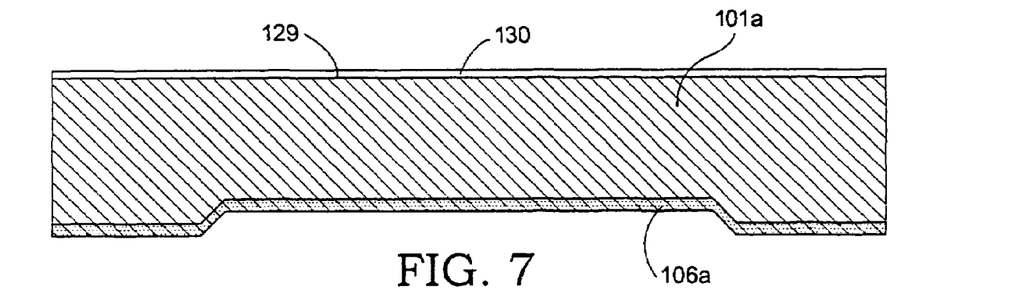
Figure 8:
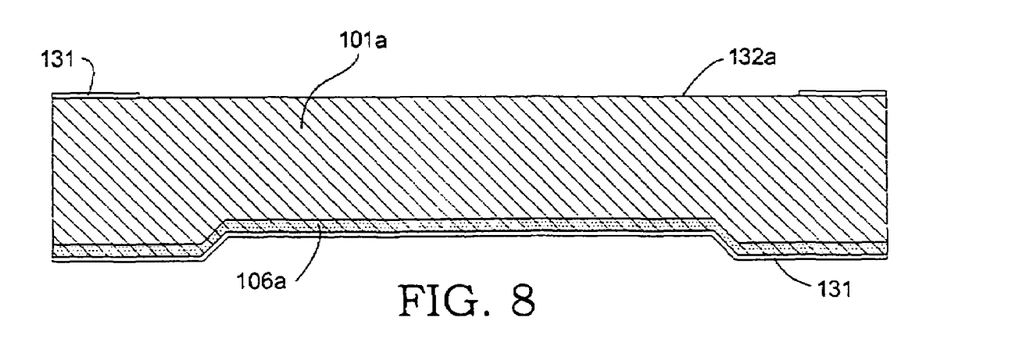
Figure 9:
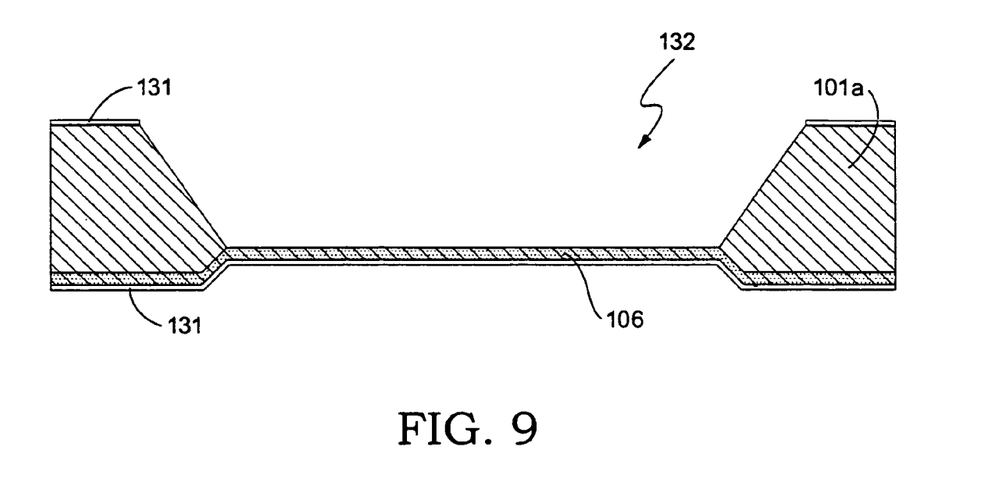
Figure 10:
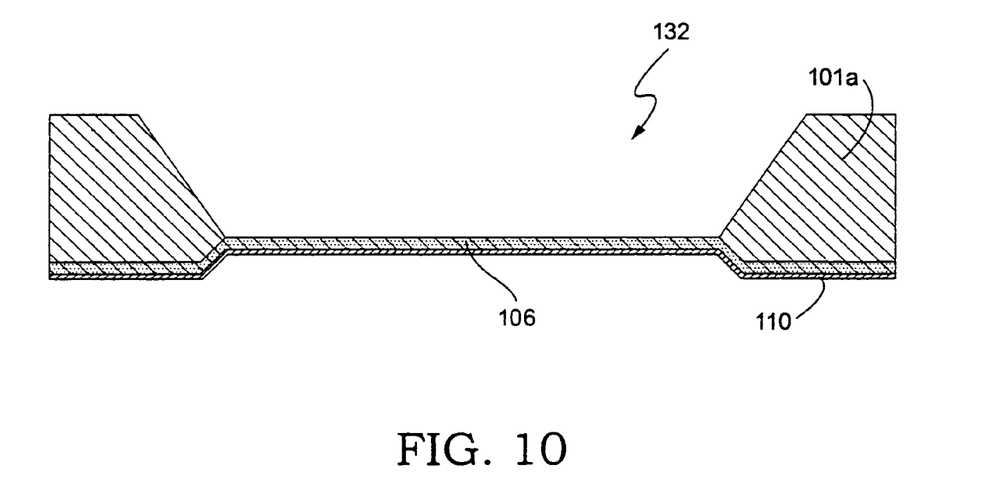
Figure 11:
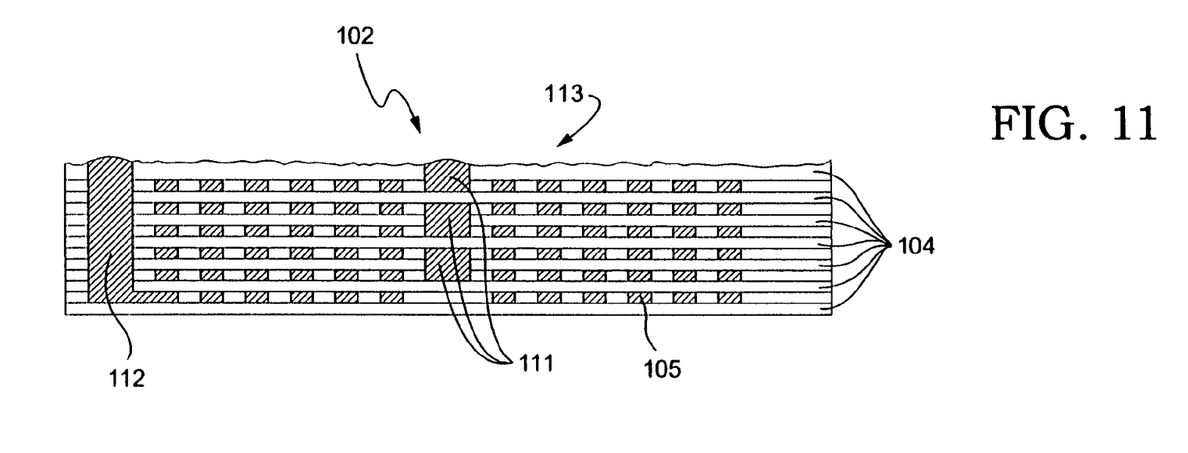

Referring now to FIG. 7, a second preferred method for the etching of cavity 109a is Deep Reactive Ion Etching (DRIE). Here, masking layer 130 is subsequently removed from the front 128 of substrate 101a and a bulk layer 106a is formed in substrate 101a. A preferred method for the formation of bulk layer 106a is diffusion of boron into substrate 101a at an elevated temperature. A second preferred method for the formation of bulk layer 106a is the use of silicon on insulator (SOI) substrates, in which a bulk layer has been pre-formed. Masking layer 130 is subsequently removed from substrate 101a and a second masking layer 131 is then deposited on bulk layer 106a. Preferred materials for the second masking layer 131 include silicon dioxide, silicon nitride, and photoresist. As seen in FIG. 8, masking layer 131 is patterned on the backside 129 of substrate 101a to form an opening 132a, and substrate 101a is etched to form cavity 132 shown in FIG. 9. The etchant is chosen, such that etching seizes upon exposure of the bulk layer 106a, thereby forming the diaphragm 106. Preferred methods for etching cavity 132 include chemical solutions of potassium hydroxide (KOH) and isopropylalcohol (IPA) and deep reactive ion etching (DRIE). As shown in FIG. 10, masking layer 131 is then stripped, and a conductive layer 110 is deposited on the front 128 of substrate 101a to provide for a highly conductive diaphragm 106. Conductive layer 110 also serves as a bonding surface to the hybrid substrate 102 in the final device. Preferred materials for conductive layer 110 include aluminum, silver, tin, lead, copper, gold, platinum, palladium, nickel, chromium, titanium and alloys thereof.

Figure 12:
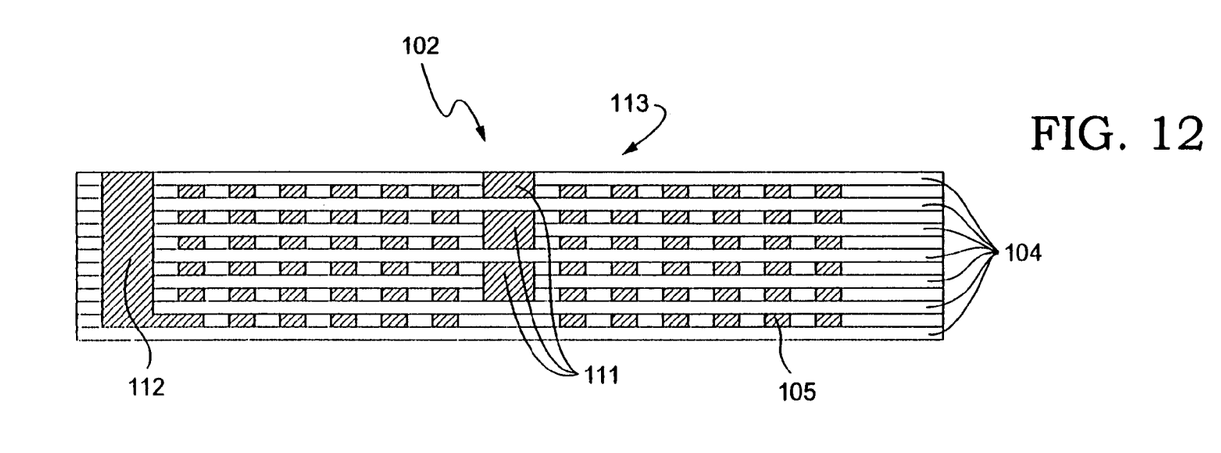
Figure 13:
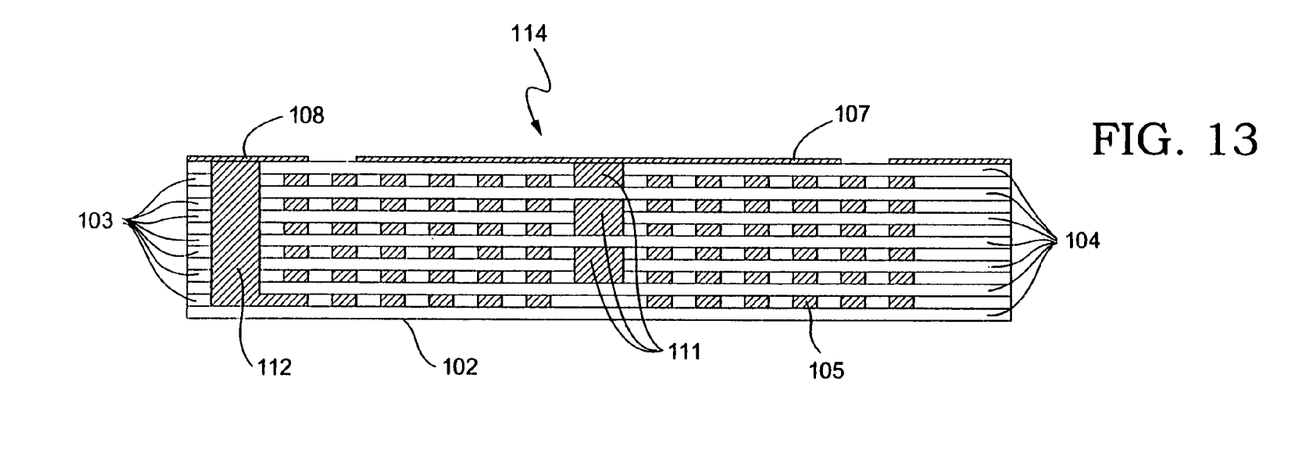

Hybrid substrate 102 is readily available with all dielectric layers 104, conductive layers 105, and vias 111 and 112 preformed from manufacturing sources using standard low-temperature co-fired ceramics (LTCC) technology. However, the surface roughness of standard LTCC substrates is too great for micro-fabrication. Therefore, as shown in FIG. 12, the front 113 of ceramic substrate 102 is first polished to achieve a surface roughness of less than 0.1 micron. During the polishing process, the top ceramic layer and vias are partially removed. Subsequently a thin conductive layer is deposited and patterned on the front 113 of the ceramic substrate 102, forming the fixed counter electrode 107, and bonding area 108 shown in FIG. 13. The fixed counter electrode 107 is connected to the buried inductor 105 through polished via 111. The diaphragm conductor 110 is connected to the other end of the buried inductor 105 through bonding area 108 and another polished via 112. Preferred materials for the conductive layer 114 on the ceramic substrate 102 include aluminum, silver, tin, lead, copper, gold, platinum, palladium, nickel, chromium, titanium and alloys thereof.

Figure 14:
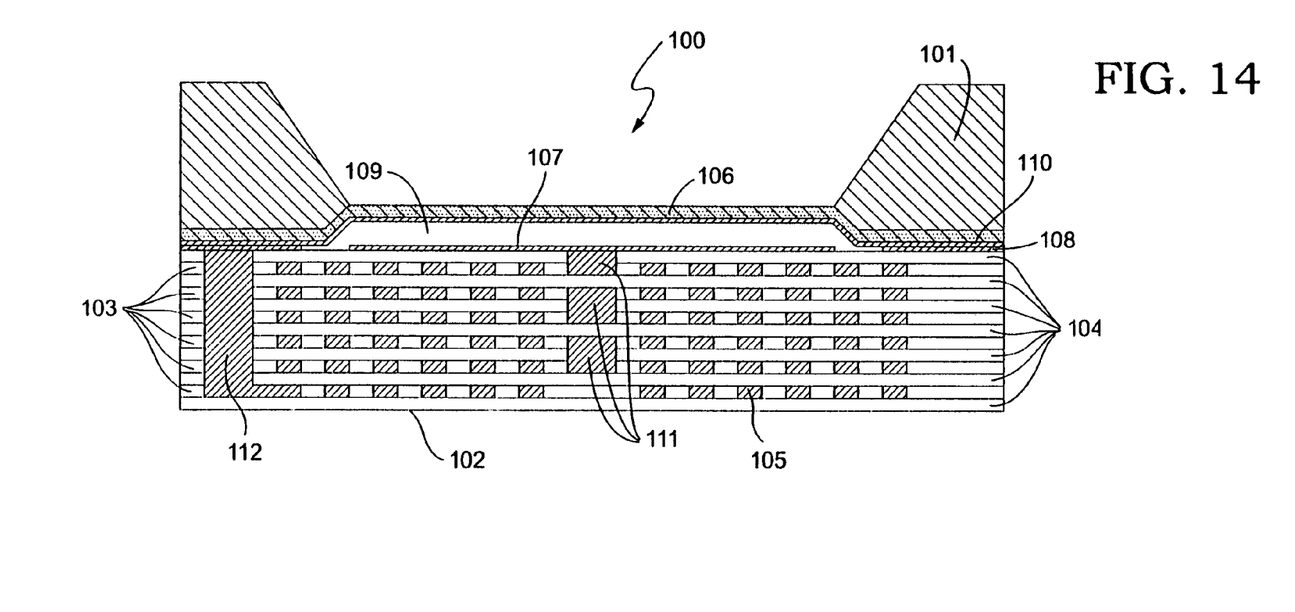

Finally, the two substrates 101 and 102 are bonded together to form the complete sensing structure 100, as shown in FIG. 14. A preferred method for bonding substrates 101 and 102 is eutectic bonding. The bonding hermetically seals the cavity 109, thereby forming an absolute pressure sensing device 100. A differential pressure sensing structure can be formed by adding an opening in the substrate 101 to provide access to cavity 109. It is possible to form said opening with the same etch process used to form the initial cavity 109a. The bonding process can be performed in a controlled atmosphere, in terms of pressure and gas composition, to form a reference cavity for specialized applications.

Although the present invention has been described in terms of a particular embodiment and method, it is not intended that the invention be limited to that embodiment or method. Modifications of the embodiment and method within the spirit of the invention will be apparent to those skilled in the art. The scope of the invention is defined by the claims that follow.

What is claimed is:

1. A method of forming a micro-mechanical pressure sensor comprising the steps of:
   providing a first substrate,
   depositing a first masking layer on the first substrate,
   patterning the first masking layer on a front side of the first substrate,
   etching a cavity on the front side of the first substrate,
   removing the first masking layer from the first substrate,
   forming a bulk layer in the front side of the first substrate,
   depositing a second masking layer on the bulk layer,
   patterning the second masking layer on the back side of the first substrate to form an opening,
   etching a second cavity on the back side of the first substrate, thereby forming a diaphragm in the first substrate,
   removing the second masking layer from the first substrate,
   depositing a conductive layer on the front side of the first substrate to provide a highly conductive diaphragm,
   providing a second substrate formed from a plurality of dielectric layers and a plurality of conductive layers forming an inductive coil,
   polishing the front side of the second substrate to achieve a smooth surface,
   depositing a second conductive layer on the front side of the second substrate,
   patterning the second conductive layer to form a counter electrode and a bonding area, and
   bonding the first and second substrates together to form an air gap between the conductive diaphragm and the counter electrode.

2. The method of forming a micro-mechanical pressure sensor as recited in claim 1, wherein the first substrate is single crystal silicon.

3. The method of forming a micro-mechanical pressure sensor as recited in claim 1, wherein the first substrate is silicon on insulator (SOI).

4. The method of forming a micro-mechanical pressure sensor as recited in claim 1, wherein the second substrate is a low-temperature co-fired ceramic (LTCC).

5. The method of forming a micro-mechanical pressure sensor as recited in claim 1, wherein the second substrate is a high-temperature co-fired ceramic (HTCC).

6. The method of forming a micro-mechanical pressure sensor as recited in claim 1, wherein the second substrate is sequentially-build-up (SBU) multi-layer printed circuit boards.

7. The method of forming a micro-mechanical pressure sensor as recited in claim 1, wherein the diaphragm is formed in the first substrate by chemical etching.

8. The method of forming a micro-mechanical pressure sensor as recited in claim 7, wherein the chemical etching is performed in a solution of water and potassium hydroxide (KOH).

9. The method of forming a micro-mechanical pressure sensor as recited in claim 7, wherein the chemical etching is performed by deep reactive ion etching (DRIE).

10. The method of forming a micro-mechanical pressure sensor as recited in claim 7, wherein the bulk layer is formed in the first substrate to provide a natural termination for the chemical etching.

11. The method of forming a micro-mechanical pressure sensor as recited in claim 1, wherein the bulk layer is formed by the diffusion of boron in the first substrate at an elevated temperature.

12. The method of forming a micro-mechanical pressure sensor as recited in claim 1, wherein the conductive layer on the diaphragm is formed from at least one metal selected from the group consisting of aluminum, silver, tin, lead, copper, gold, platinum, palladium, nickel, chromium, titanium, and alloys thereof.

13. The method of forming a micro-mechanical pressure sensor as recited in claim 1, wherein the first and second substrates are bonded together using thermo-compression bonding.

14. The method of forming a micro-mechanical pressure sensor as recited in claim 1, wherein the first and second substrates are bonded together using eutectic bonding.

15. The method of forming a micro-mechanical pressure sensor as recited in claim 1, wherein a top surface of the second substrate is polished in preparation for the formation of the counter electrode.

16. The method of forming a micro-mechanical pressure sensor as recited in claim 1, wherein the polishing of the top surface of the second electrode is mechanical polishing.

17. The method of forming a micro-mechanical pressure sensor as recited in claim 1, wherein the counter electrode is formed from at least one metal selected from the group consisting of aluminum, silver, tin, lead, copper, gold, platinum, palladium, nickel, chromium, titanium, and alloys thereof.

18. The method of forming a micro-mechanical pressure sensor as recited in claim 1, wherein the first masking layer is formed from a material selected from the group consisting of silicon dioxide, silicon nitride, and photoresist.

19. The method of forming a micro-mechanical pressure sensor as recited in claim 1, wherein the step of etching the cavity on the front side of the first substrate is performed using an etchant selected from the group consisting of potassium hydroxide (KOH), tetramethyl ammonium hydroxide (TMAH), cesium hydroxide (CsOH), ethylenediamene pyrocatecol (EDP), and deep reactive ion etching (DRIE).

20. The method of forming a micro-mechanical pressure sensor as recited in claim 1, wherein the step of etching the cavity on the back side of the first substrate is performed using an etchant selected from the group consisting of potassium hydroxide (KOH) and isoprophyalcohol (IPA), tetramethyl ammonium hydroxide (TMAH), cesium hydroxide (CsOH), ethylenediamene pyrocatecol (EDP), and deep reactive ion etching (DRIE).

21. The method of forming a micro-mechanical pressure sensor as recited in claim 1, wherein the first substrate is hermetically bonded to the second substrate.

* * * * *